3,384,472
METHOD AND COMPOSITION FOR INHIBITING PLANT GROWTH
Dorsey R. Mussell, Clare, and Theodore W. Holmsen, Midland, Mich., assignors to The Dow Chemical Company, Midland, Mich., a corporation of Delaware
No Drawing. Filed Nov. 1, 1965, Ser. No. 505,953
10 Claims. (Cl. 71—104)

ABSTRACT OF THE DISCLOSURE

A method and composition for the control of plants comprising, as the active ingredient in such method and composition, a phenyl thiocyanate such as (4-hydroxyphenyl)thiocyanate, (3-bromo-5-chloro - 4 - (methylcarbamoyloxy)phenyl)thiocyanate or (2-bromo-4-hydroxyphenyl)thiocyanate. The method comprises applying to the above-ground portion of the plant of subdivision Angiospermae, a growth-inhibiting amount of one or more of the phenyl thiocyanate compounds.

---

The present invention resides in improved methods and compositions for the control of plants. These methods employ, and the compositions comprise, a phenyl thiocyanate of one of the formulae:

A. 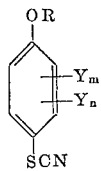

B. 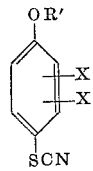

wherein R represents hydrogen, methyl, or (methylcarbamoyl); R' represents methyl or (methylcarbamoyl); each X independently represents bromine or chlorine; each Y independently represents methyl or (methylthio); $m$ represents an integer of from 0 to 1, both inclusive; $n$ represents an integer of from 0 to 2, both inclusive; and the sum of $m$ and $n$ is an integer of from 0 to 2, both inclusive.

In the present specification and claims, the term "phenyl thiocyanate" is employed to designate a compound or compounds of the foregoing definition, only. The phenyl thiocyanate compounds are liquids or crystalline solid materials. Representative phenyl thiocyanate compounds include the following: (4-hydroxyphenyl) thiocyanate; (3-methyl-4-hydroxyphenyl) thiocyanate; (3 - chloro-4-hydroxyphenyl) thiocyanate; (2-bromo-4-hydroxyphenyl) thiocyanate; (3-(methylthio)-4-hydroxyphenyl) thiocyanate; (4-methoxyphenyl) thiocyanate; (2-methyl-4-methoxyphenyl) thiocyanate; (3,5 - dimethyl - 4 - methoxyphenyl) thiocyanate; (2-chloro-4-(methylcarbamoyloxy)-phenyl) thiocyanate; (3 - bromo - 4 - (methylcarbamoyloxy)phenyl) thiocyanate; (3-bromo-5-chloro-4-(methylcarbamoyloxy)phenyl) thiocyanate; and (3 - (methylthio)-4-(methylcarbamoyloxy)phenyl) thiocyanate.

The method of the present invention comprises applying to an above-ground-level portion of a plant of subdivision Angiospermae a growth-inhibiting amount of one or more of the specified phenyl thiocyanate compounds. It is critical to the practice of the present invention that the application be made to an above-ground-level portion of the plant, inasmuch as contact through the roots or of seeds has been found not to afford the desired herbicidal effect at any reasonable rates of application. Such absence of herbicidal effect via routes other than that of vegetative contact is highly advantageous in that it permits of obtaining excellent control of undesired plants without adversely effecting the ability of soil to support subsequent growth, in particular, subsequent growth of seeds. In this respect, the behavior of the instant phenyl thiocyanate compounds has been found to be uniform, regardless of the species identity of the seeds. Moreover, by appropriate selection of particular phenyl thiocyanate compounds and choice of appropriate rates, the present invention can be practiced so as to achieve a selective growth-inhibiting effect, whereby one plant species, typically an economic crop plant, is treated, but left essentially uneffected, while other plant species growing as weeds are effectively controlled. Furthermore, with appropriate spraying techniques, the present invention can be employed for the control of weeds between rows of crop plants; the relative herbicidal inactivity of the present phenyl thiocyanates in the soil assures that only the undesired weeds are controlled.

While the applying of one or more of the phenyl thiocyanate compounds in a growth-inhibiting amount is essential to the practice of the present invention, the precise amount is not critical. The amount to be employed in a given situation varies, and is dependent on such factors as whether general or selective treatment is desired, the species treated, the age of the plants, weather conditions, etc. Usually, good results are obtained when employing from 0.1 to 20 pounds or more per acre. Higher rates can be employed; however, since the employment of such rates generally affords no advantage, their usage is uneconomical.

The method of the present invention can be carried out with the unmodified phenyl thiocyanate compounds, but is preferably carried out with a composition comprising one or more of the phenyl thiocyanate compounds. Such composition can contain one or a plurality of additaments, including water, organic solvents, and other liquid carriers; surface-active dispersing agents; and inert finely divided solids. Because of the greater uptake by vegetative plant portions from liquids, the use of liquid compositions is generally preferred to that of solid compositions; however, in some instances the use of the latter is advantageous.

One preferred composition comprises phenyl thiocyanate, an aromatic hydrocarbon solvent, and a surface-active dispersing agent. Another preferred composition comprises phenyl thiocyanate, a surface-active dispersing agent, and an inert finely divided solid. Either of these compositions can be employed directly for treatment but is preferably employed as a concentrate and subsequently dispersed in water to obtain an aqueous treating composition. In these compositions, the respective additaments cooperate with the phenyl thiocyanate compound so as to facilitate the practice of the present invention and to obtain an improved result.

The exact concentration of one or more of the phenyl thiocyanate compounds to be employed in compositions is not critical and can vary considerably provided the required dosage of agent is supplied upon the above-ground-level surfaces of plants. The concentration of toxicant in liquid compositions employed to supply the desired dosage generally is from about 0.005 to 50 percent by weight, although concentrations as high as 90 percent by weight are sometimes employed. In solid compositions the concentration of toxicant can be from 0.1 to 80 percent by weight. When such compositions are employed primarily or exclusively as concentrates, the active agent can be present in a concentration of from 5 to 98 percent by weight.

The quantity of treating composition to be employed can also vary considerably provided that the required dosage of active ingredient is applied in sufficient of the finished composition to cover adequately the vegetation to be treated. In the treatment of small seedling weeds, good coverage is obtained when using from 10 to 60 gallons of finished spray composition per acre. Where large succulent vegetation is concerned, it is frequently desirable to employ up to 250 gallons or more of the finished spray composition per acre to assure complete coverage of the above-ground-level portion of the vegetation.

Liquid compositions containing the active ingredient are prepared by dissolving one or more of the phenyl thiocyanate compounds in a suitable liquid with or without the aid of a surface active dispersing agent. The preferred liquid composition is prepared by dissolving one or more of the phenyl thiocyanates in an aromatic hydrocarbon solvent with the aid of a surface-active dispersing agent. Suitable aromatic hydrocarbon solvents include benzene, toluene, and xylene. The preferred solid composition is prepared by intimately dispersing one or more of the phenyl thiocyanate compounds on an inert finely divided solid simultaneously with a quantity of a surface-active dispersing agent. In one method of achieving such dispersion, the finely divided carrier is mechanically mixed or ground with surface-active dispersing agent and the phenyl thiocyanate compound or compounds. Depending upon the proportions of ingredients, these compositions can be employed as concentrates and subsequently diluted with additional additaments to obtain the desired amount of active ingredient in a composition adapted to be employed for the suppression of the growth of the plants. Also, such compositions can be dispersed in water to form spray mixtures.

The expression "surface active dispersing agent," as herein employed, is intended to include all agents which are capable of acting at the interfacial surface between the phenyl thiocyanate compound and water or other liquid medium, facilitating thereby the dispersion of the phenyl thiocyanate in the medium. The term is inclusive of solid emulsifying agents such as finely divided bentonite, pyrophyllite, fuller's earth, attapulgite, silica, other clays, and mineral carriers, as well as liquid wetting and dispersing agents.

The term "finely divided inert solids," as herein employed, refers to materials whose primary function is not as dispersant of the phenyl thiocyanate compounds in a liquid medium but as carrier for dust compositions. Representative of such materials are chalk, talc, gypsum, powdered walnut shells, etc.

Satisfactory results are obtained when the toxicants of the present invention, or compositions comprising these toxicants, are combined with other agricultural materials intended to be applied to plants, plant parts, or their habitats. Such materials include fertilizers, fungicides, insecticides, other herbicides, soil conditioning agents, and the like.

When operating in accordance with the present invention, a growth inhibiting amount of one or more of the phenyl thiocyanate compounds is applied in any convenient fashion, most typically with boom and hand sprayers, whether surface or air-borne.

In addition, the present method also comprehends the employment of an aerosol composition containing one or more of the present phenyl thiocyanate compounds as an active compound. Such a composition is prepared according to conventional methods wherein the toxicant is dispersed in a solvent, and the resultant dispersion mixed with a propellant in liquid state. Such variables as the particular toxicant to be used and the nature of that which is to be treated will determine the desirability of the solvent and concentration of the toxicant therein. Examples of suitable solvents are water, acetone, isopropanol, and 2-ethoxyethanol.

Example 1

In separate operations, aqueous compositions containing representative phenyl thiocyanate compounds are prepared as follows.

Each of the representative phenyl thiocyanate compounds is separately formulated in water with an alkyl aryl sodium sulfonate (Nacconol NR) and a substituted benzoid alkyl sulfonic acid (Daxad No. 27) to produce an aqueous composition. In these operations, the materials are ballmilled together to produce a composition containing 300 parts by weight of Nacconol NR, 300 parts by weight of Daxad No. 27, and 0.5 pound of the representative compound per 100 gallons of ultimate aqueous mixture.

The representative phenyl thiocyanate compounds with which these operations are carried out include: (4-hydroxyphenyl) thiocyanate; (3-methyl-4-hydroxyphenyl) thiocyanate; (3-chloro-4-hydroxyphenyl) thiocyanate; (2-bromo-4-hydroxyphenyl) thiocyanate; (3-(methylthio)-4-hydroxyphenyl) thiocyanate; (4-methoxyphenyl) thiocyanate; (3,5-dimethyl-4-methoxyphenyl) thiocyanate; (3-bromo-4-(methylcarbamoyloxy)phenyl) thiocyanate; (3-bromo-5-chloro-4-(methylcarbamoyloxy)phenyl) thiocyanate; and (3-(methylthio)-4-(methylcarbamoyloxy)phenyl)thiocyanate.

Example 2

A representative liquid formulation comprising the active agent was prepared by dissolving 5 parts by weight of (3-chloro-4-hydroxyphenyl) thiocyanate, 90 parts by weight of xylene, and 5 parts by weight of a 3:1 mixture of, respectively, a sorbitan tall oil ethylene oxide adduct (Atlox 8196–T) and calcium dodecyl benzenesulfonate (Emcol P–10–20P), to form a water-dispersible mixture. Another formulation identical with the foregoing except that (4-hydroxyphenyl) thiocyanate was employed as phenyl thiocyanate compound was prepared. Other formulations of this type are readily prepared with all of the remaining phenyl thiocyanate compounds.

Example 3

Other compositions comprising phenyl thiocyanate compounds are prepared as follows:

In a first operation, five parts by weight of one of the phenyl thiocyanate compounds, 88 parts by weight of attapulgite clay, 2 parts by weight of a polymerized sodium salt of substituted benzoid alkyl sulfonic acid (Daxad 27), and 5 parts by weight of an alkyl aryl sulfonate (Acto 700) are blended and hammermilled together to produce a composition, which, if desired, can be readily dispersed in water.

In a second operation, 5 parts by weight of one of the phenyl thiocyanate compounds, 88 parts by weight of attapulgite clay, and 7 parts by weight of a sodium alkyl aryl sulfonate (Nacconol NR) are blended and hammermilled together to produce a water-dispersible composition.

Each of the foregoing types of compositions is prepared, in separate operations for each compound, with each of the representative phenyl thiocyanate compounds identified in Example 1.

Example 4

Aqueous compositions each containing 10,000 parts by weight of one of various phenyl thiocyanate compounds per million parts by weight of ultimate mixture were prepared according to the formulating procedures of Example 1. These compositions were then employed for the control of various plant species.

In the treating operations, the compositions were applied as foilage sprays to plots of the various species. At the time of the applications, the plants were about four inches in height. The treatments were carried out with conventional spraying equipment, the applications being made to the point of run-off and corresponding to a dosage of about 20 pounds of toxicant per acre. Similar plots of the various plant species were left untreated to serve as checks.

After about two weeks, the plots were examined to ascertain what control of the growth of the plants had been obtained. The test compounds and plant species employed, together with the results obtained, are set forth in the following table.

TABLE I
[Percent Kill and Control of the Growth of Seedling Species]

| Test Compound | Pig-weed | Mari-gold | Crab-grass | German Millet | Cucumber |
|---|---|---|---|---|---|
| (3-chloro-4-hydroxyphenyl) thiocyanate | 100 | 80 | 80 | 100 | 100 |
| (3,5-dibromo-4-hydroxyphenyl) thiocyanate | 100 | 90 | 100 | 80 | 100 |
| (2-methyl-4-hydroxyphenyl) thiocyanate | 100 | 100 | 100 | 100 | 100 |
| (3-methyl-4-hydroxyphenyl) thiocyanate | 100 | 100 | 60 | 100 | 100 |

At the time of the observations, heavy stands of the named plant species were found in the check plots.

Example 5

Representative phenyl thiocyanate compounds were evaluated for the control of crabgrass plants, of a height of about 4 inches. The evaluations were carried out in accordance with the procedures of Example 4, except that the aqueous compositions contained the respective phenyl thiocyanate compound at a concentration of only 4,000 parts of compound per million parts by weight of ultimate composition.

The phenyl thiocyanate compounds evaluated and the results obtained are set forth in the following table:

TABLE II

| Compound evaluated: | Percent kill and control of the growth of crabgrass plants |
|---|---|
| (4-hydroxyphenyl) thiocyanate | 100 |
| (4-methoxyphenyl) thiocyanate | 100 |
| (2-methyl-4-hydroxyphenyl) thiocyanate | 90 |
| (3-chloro-4-hydroxyphenyl) thiocyanate | 100 |
| (2-bromo-4-hydroxyphenyl) thiocyanate | 70 |
| (2-methyl-4-methoxyphenyl) thiocyanate | 100 |
| (3-chloro-4-methoxyphenyl) thiocyanate | 98 |
| (3,5-dichloro-4-methoxyphenyl) thiocyanate | 80 |
| (2-chloro-4-(methylcarbamoyloxy)-phenyl) thiocyanate | 80 |
| (3-bromo-5-chloro-4-(methylcarbamoyloxy) phenyl) thiocyanate | 80 |

At the time of the observations, heavy stands of the named plant species were found in the check plots.

Example 6

Various of the phenyl thiocyanate compounds were employed for the selective control of pigweed and crabgrass in plots planted with corn. The compounds were employed in the form of aqueous spray compositions prepared in accordance with the procedures of Example 1 and containing 5,000 parts of the respective test compound per million parts by weight of ultimate composition. The compositions were applied to the plants at a height of about four inches. The treatments were carried out with conventional spraying equipment, the applications being made to the point of run-off and corresponding to a dosage of about 10 pounds of toxicant per acre.

After about two weeks, all of the plots were examined to ascertain what control of plant growth had taken place. The results were as set forth in the following table:

TABLE III

| Test Compound | Percent Kill and Control of the Growth of Various Plant Species | | |
|---|---|---|---|
| | Corn | Pig-weed | Crab-grass |
| (3-chloro-4-hydroxyphenyl) thiocyanate | 0 | 100 | 70 |
| (3,5-dibromo-4-hydroxyphenyl) thiocyanate | 0 | 100 | 100 |
| (2-methyl-4-hydroxy-phenyl) thiocyanate | 0 | 100 | 100 |

At the time of the observations, heavy stands of all of the named plant species were found in the check plots; and the corn plants in all of the treated plots were growing and appeared in all respects to be healthy.

Example 7

The procedures of Example 6 were repeated except that wheat was employed as the crop plant instead of corn. The results were as set forth in the following table:

TABLE IV

| Test Compound | Percent Kill and Control of the Growth of Various Plant Species | | |
|---|---|---|---|
| | Wheat | Pig-weed | Crab-grass |
| (3-chloro-4-hydroxy-phenyl) thiocyanate | 0 | 100 | 70 |
| (3,5-dibromo-4-hydroxyphenyl) thiocyanate | 0 | 100 | 100 |
| (3-methyl-4-hydroxyphenyl) thiocyanate | 0 | 100 | 80 |

At the time of the observations, heavy stands of all of the named plant species were found in the check plots; and the wheat plants in all of the treated plots were growing and appeared in all respects to be healthy.

Example 8

An aqueous composition containing (3-chloro-4-hydroxyphenyl) thiocyanate was prepared in accordance with the procedures of Example 1. This composition was employed for the treatment of seed beds immediately following their preparation and seeding with the following plant species: pigweed, marigold, crabgrass, German millet, corn, cucumber, wild oats, pinto beans, radish, Japanese millet, Sudan grass, and meadow fascue. In the treating operations, the composition was applied to the seed beds as a soil drench and at a rate of about 0.43 acre inch of aqueous composition per acre to supply a substantially uniform dosage of 20 pounds of subject compound per acre. Other beds similarly prepared and seeded were left untreated to serve as a check.

After three weeks, all of the beds were examined to ascertain what control of the growth of seeds and emerging seedlings was obtained. In both the check and treated beds, all of the plant species had germinated and the resulting seedlings were thriving. It was judged that there was no difference between the check and treated beds.

Similar results are obtained when other representative phenyl thiocyanate compounds are evaluated under the same procedures.

The phenyl thiocyanate compounds are prepared in various known procedures. Those wherein R represents hydrogen (Formula A) are prepared by reacting a phenol compound, of the formula

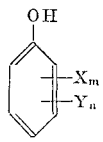

wherein the position para to the —OH group is unsubstituted, with sodium thiocyanate in methanol saturated with sodium bromide. Thereafter, a solution of bromine in methanol saturated with sodium bromide is added portionwise over a period of time. Separation, and if desired, purification, are conducted in conventional manners.

Those compounds wherein R represents (methylcarbamoyl) (Formula A) and those wherein R' represents (methylcarbamoyl) (Formula B) are prepared by reacting the corresponding phenol products with methyl isocyanate. The remaining phenyl thiocyanate compounds, wherein R represents methyl (Formula A) and wherein R' represents methyl (Formula B), are prepared in standard methods for the preparation of ethers. In one of these methods, a (4-hydroxyphenyl) thiocyanate reactant of the formula

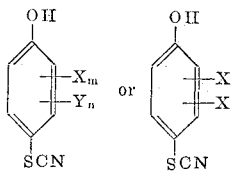

respectively, is reacted with sodium hydroxide to obtain the corresponding sodium derivative. This derivative is then reacted with dimethyl sulfate to obtain the desired corresponding product wherein R or R', respectively represents methyl. Other known methods can also be employed.

We claim:
1. Method which comprises applying to an aboveground-level portion of a plant of subdivision Angiospermae a growth-inhibiting amount of a phenyl thiocyanate compound of one of the formulae

A.
B.

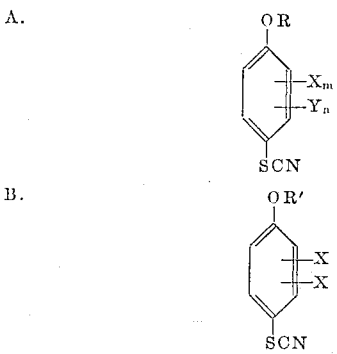

wherein R represents hydrogen, methyl, or (methylcarbamoyl); R' represents methyl or (methylcarbamoyl); each X independently represents bromine or chlorine; each Y independently represents methyl or (methylthio); $m$ represents an integer of from 0 to 1, both inclusive; $n$ represents an integer of from 0 to 2, both inclusive; and the sum of $m$ and $n$ is an integer of from 0 to 2, both inclusive.

2. Method of claim 1 wherein the phenyl thiocyanate compound is (3-chloro-4-hydroxyphenyl) thiocyanate.
3. Method of claim 1 wherein the phenyl thiocyanate compound is (3,5-dibromo-4-hydroxyphenyl) thiocyanate.
4. Method of claim 1 wherein the phenyl thiocyanate compound is (2-methyl-4-hydroxyphenyl) thiocyanate.
5. Method of claim 1 wherein the phenyl thiocyanate compound is (3-methyl-4-hydroxyphenyl) thiocyanate.
6. Composition comprising an inert finely divided solid, a surface-active dispersing agent and a plant growth inhibiting amount of from 0.1 to 98 percent by weight of a phenyl thiocyanate compound of one of the formulae

A.
B.

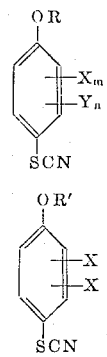

wherein R represents hydrogen, methyl or (methylcarbamoyl); R' represents methyl or (methylcarbamoyl); each X independently represents bromine or chlorine; each Y independently represents methyl or (methylthio); $m$ represents an integer of from 0 to 1, both inclusive; $n$ represents an integer of from 0 to 2, both inclusive; and the sum of $m$ and $n$ is an integer of from 0 to 2, both inclusive.

7. An aqueous dispersion of the composition of claim 6 wherein the phenyl thiocyanate compound is present in an amount of at least 0.005 percent by weight.
8. Composition comprising an aromatic hydrocarbon solvent, a surface-active dispersing agent and a plant growth inhibiting amount of from about 0.1 to 90 percent by weight of a phenyl thiocyanate compound of one of the formulae

A.
B.

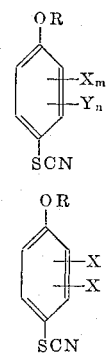

wherein R represents hydrogen, methyl or (methylcarbamoyl); R' represents methyl or (methylcarbamoyl); each X independently represents bromine or chlorine; each Y independently represents methyl or (methylthio); $m$ represents an integer of from 0 to 1, both inclusive; $n$ represents an integer of from 0 to 2, both inclusive; and the sum of $m$ and $n$ is an integer of from 0 to 2, both inclusive.

9. An aqueous dispersion of the composition of claim 8 wherein the phenyl thiocyanate compound is present in an amount of at least 0.005 percent by weight.
10. Composition comprising a surface-active dispersing agent and a plant growth inhibiting amount of from 0.1 to 98 percent by weight of a phenyl thiocyanate compound of one of the formulae A. 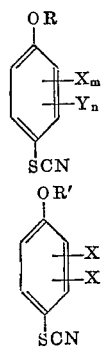

B. 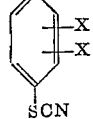

wherein R represents hydrogen, methyl or (methylcarbamoyl); R' represents methyl or (methylcarbamoyl); each X independently represents bromine or chlorine; each Y independently represents methyl or (methylthio); $m$ represents an integer of from 0 to 1, both inclusive; $n$ represents an integer of from 0 to 2, both inclusive; and the sum of $m$ and $n$ is an integer of from 0 to 2, both inclusive.

References Cited
UNITED STATES PATENTS

| 3,285,730 | 11/1966 | Weis et al. | 71—2.3 |
| 3,303,206 | 2/1967 | Reifschneider | 260—454 |

JAMES O. THOMAS, JR., *Primary Examiner.*